(12) United States Patent
Odaohhara et al.

(10) Patent No.: US 7,206,944 B2
(45) Date of Patent: Apr. 17, 2007

(54) ELECTRICAL APPARATUS, COMPUTER, AND POWER SWITCHING METHOD

(75) Inventors: Shigefumi Odaohhara, Yamato (JP); Masaki Kobayashi, Tokyo (JP)

(73) Assignee: Lenovo Singapore, Pte, Ltd, Singapore (SG)

( * ) Notice: Subject to any disclaimer, the term of this patent is extended or adjusted under 35 U.S.C. 154(b) by 482 days.

(21) Appl. No.: 10/283,942

(22) Filed: Oct. 30, 2002

(65) Prior Publication Data

US 2003/0090236 A1 May 15, 2003

(30) Foreign Application Priority Data

Oct. 30, 2001 (JP) .............................. 2001-333437

(51) Int. Cl.
G06F 1/00 (2006.01)
G06F 1/26 (2006.01)
G06F 1/30 (2006.01)
G06F 11/30 (2006.01)

(52) U.S. Cl. ..................... 713/300; 713/320; 713/340
(58) Field of Classification Search ................. 713/300
See application file for complete search history.

(56) References Cited

U.S. PATENT DOCUMENTS

| | | | | |
|---|---|---|---|---|
| 5,019,767 A | * | 5/1991 | Shirai et al. ................. | 320/112 |
| 5,148,042 A | * | 9/1992 | Nakazoe ....................... | 307/60 |
| 5,500,561 A | * | 3/1996 | Wilhelm ....................... | 307/64 |
| 5,563,493 A | * | 10/1996 | Matsuda et al. ............. | 320/124 |
| 5,689,172 A | * | 11/1997 | Koyama et al. ............. | 320/125 |
| 5,754,868 A | * | 5/1998 | Yamamoto et al. .......... | 713/300 |
| 6,060,789 A | * | 5/2000 | Yamaguchi ................... | 307/66 |
| 6,304,006 B1 | * | 10/2001 | Jungreis ....................... | 307/64 |
| 6,455,954 B1 | * | 9/2002 | Dailey .......................... | 307/66 |
| 6,693,810 B2 | * | 2/2004 | Robinson et al. ............. | 363/97 |
| 6,885,115 B2 | * | 4/2005 | Hatori et al. ................. | 307/80 |
| 2005/0057224 A1 | * | 3/2005 | Naitoh et al. ................ | 320/128 |

FOREIGN PATENT DOCUMENTS

| | | |
|---|---|---|
| JP | 64-012828 | 1/1989 |
| JP | 09-062406 | 3/1997 |

* cited by examiner

Primary Examiner—Rehana Perveen
Assistant Examiner—Michael J. Brown
(74) Attorney, Agent, or Firm—Sawyer Law Group LLP; Carlos Munoz-Bustamante

(57) ABSTRACT

An electrically powered apparatus having a system body obtains power from an AC adapter connected to the system body. The system body and AC adapter are powered from a commercial power source. A battery connected to the system body is charged, then discharged to power the system body. An embedded controller suppresses power supplied from the AC adapter on a predetermined condition while both the AC adapter and the battery are connected to the system body. In a peak shifting time zone, switches are opened to enable the battery to power the system body. When the capacity of the battery is insufficient, a switch is closed to enable the AC adapter to power an inverter. When the capacity of the battery is still insufficient, another switch is closed to enable the AC adapter to power the CPU.

11 Claims, 7 Drawing Sheets

[Figure 1]
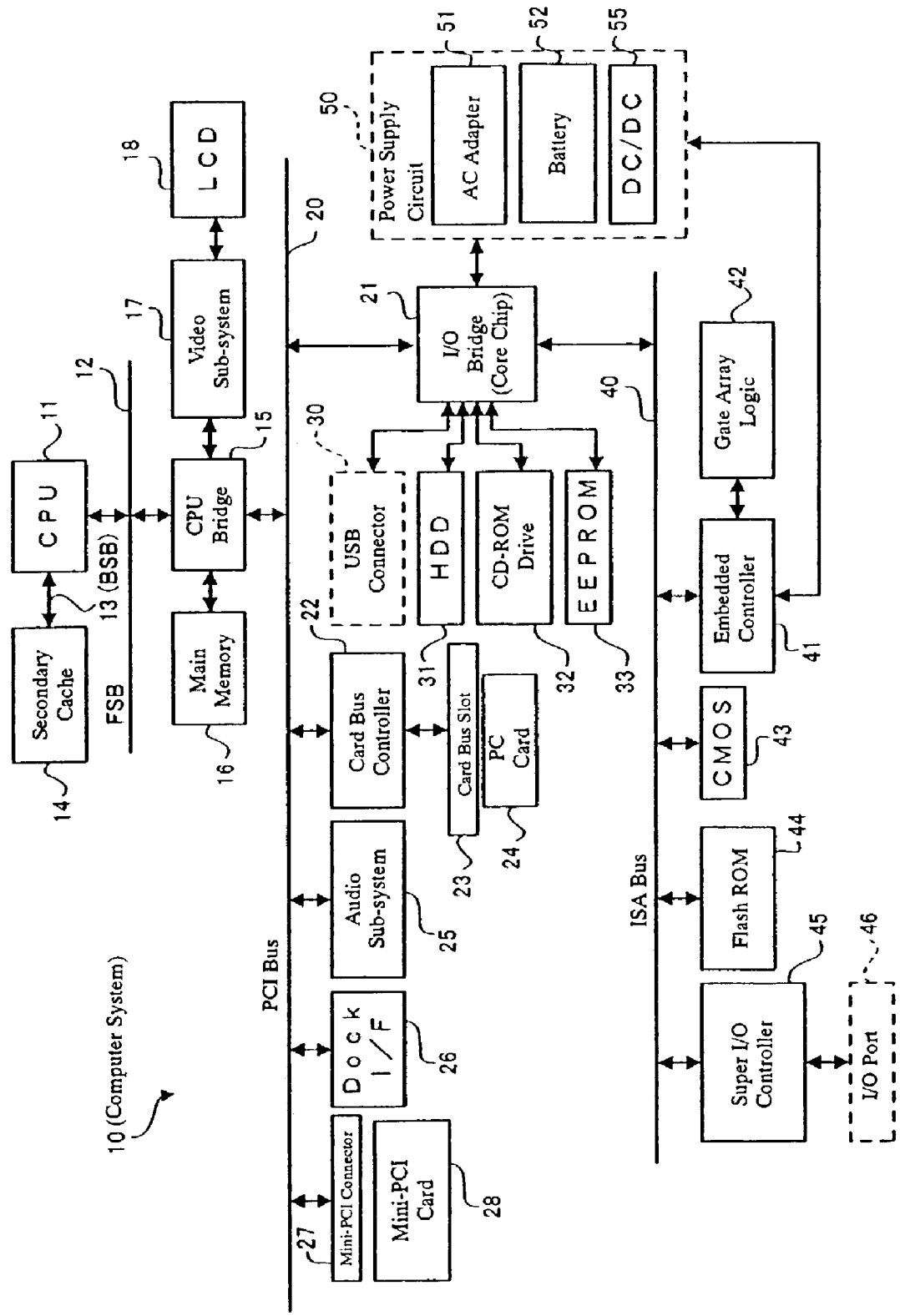

[Figure 2]
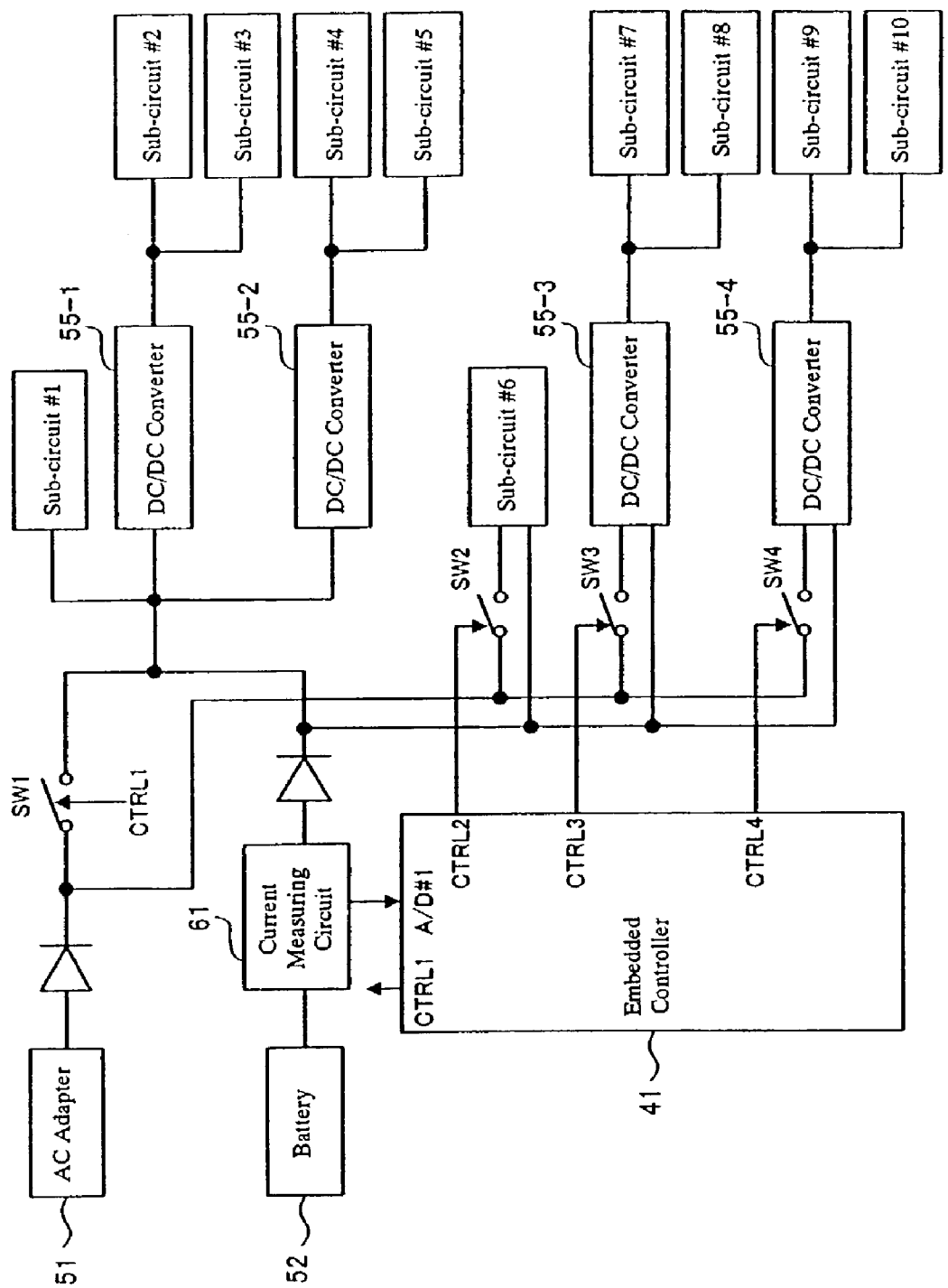

[Figure 3]
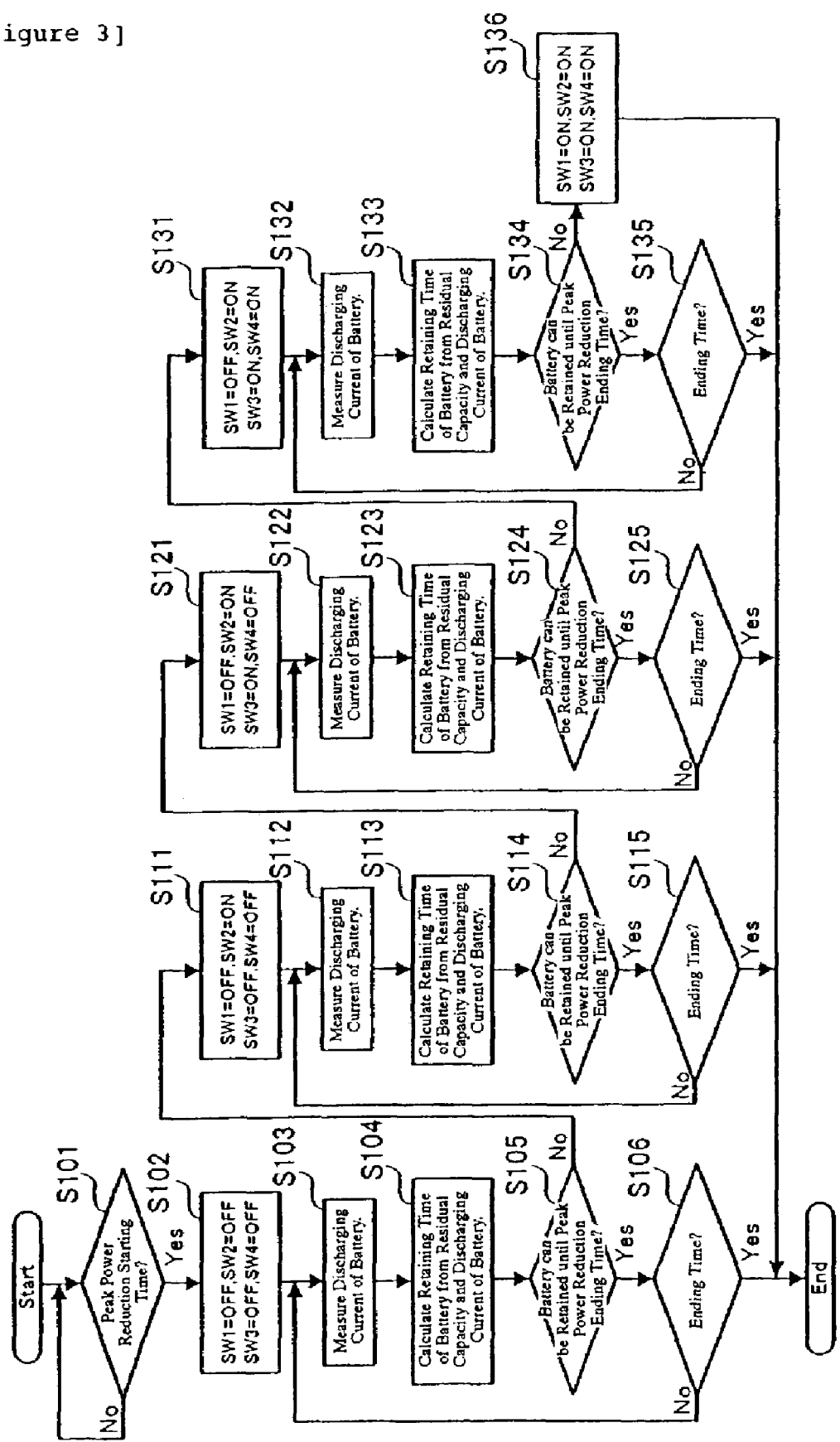

[Figure 4]
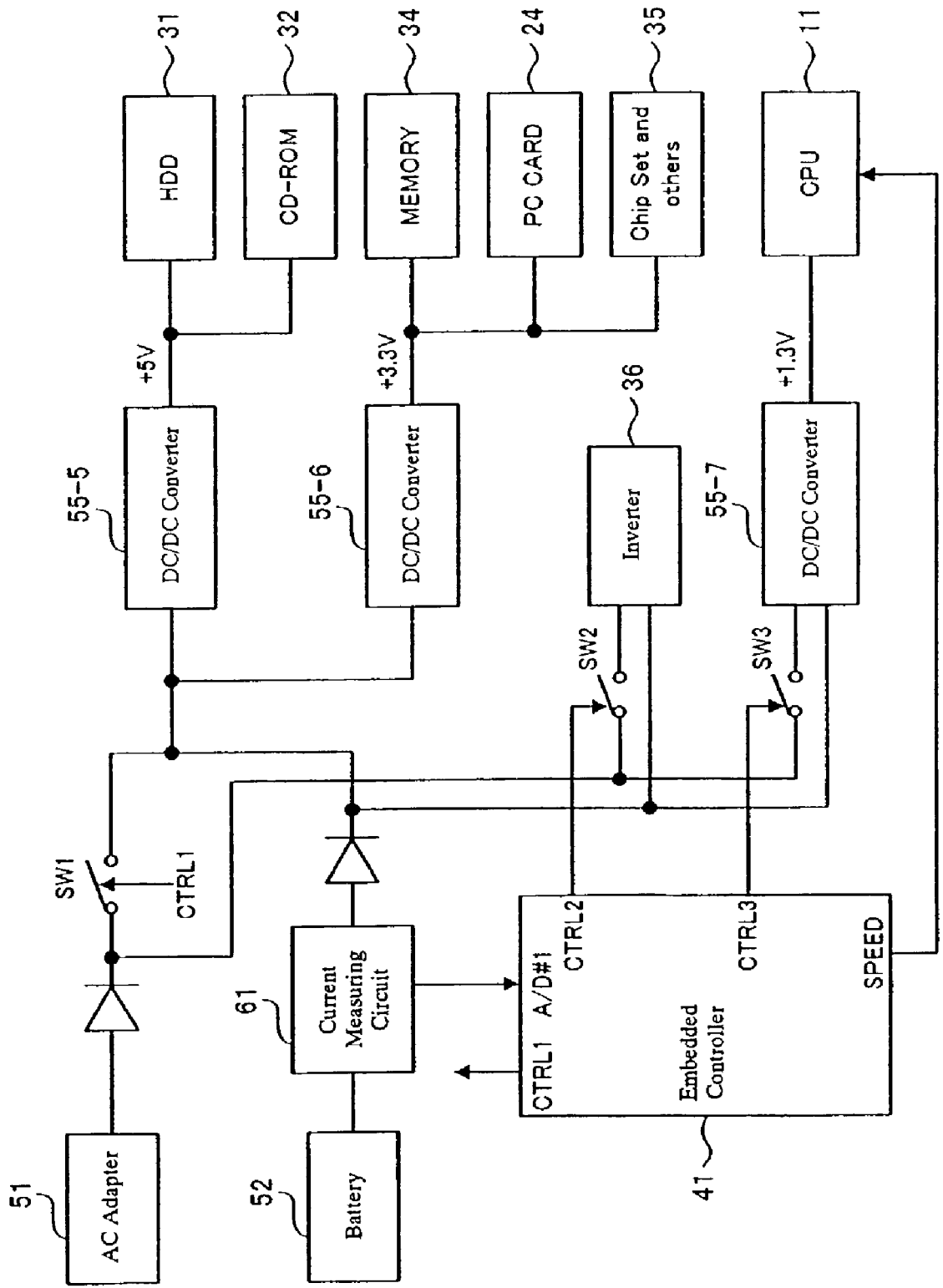

[Figure 5]
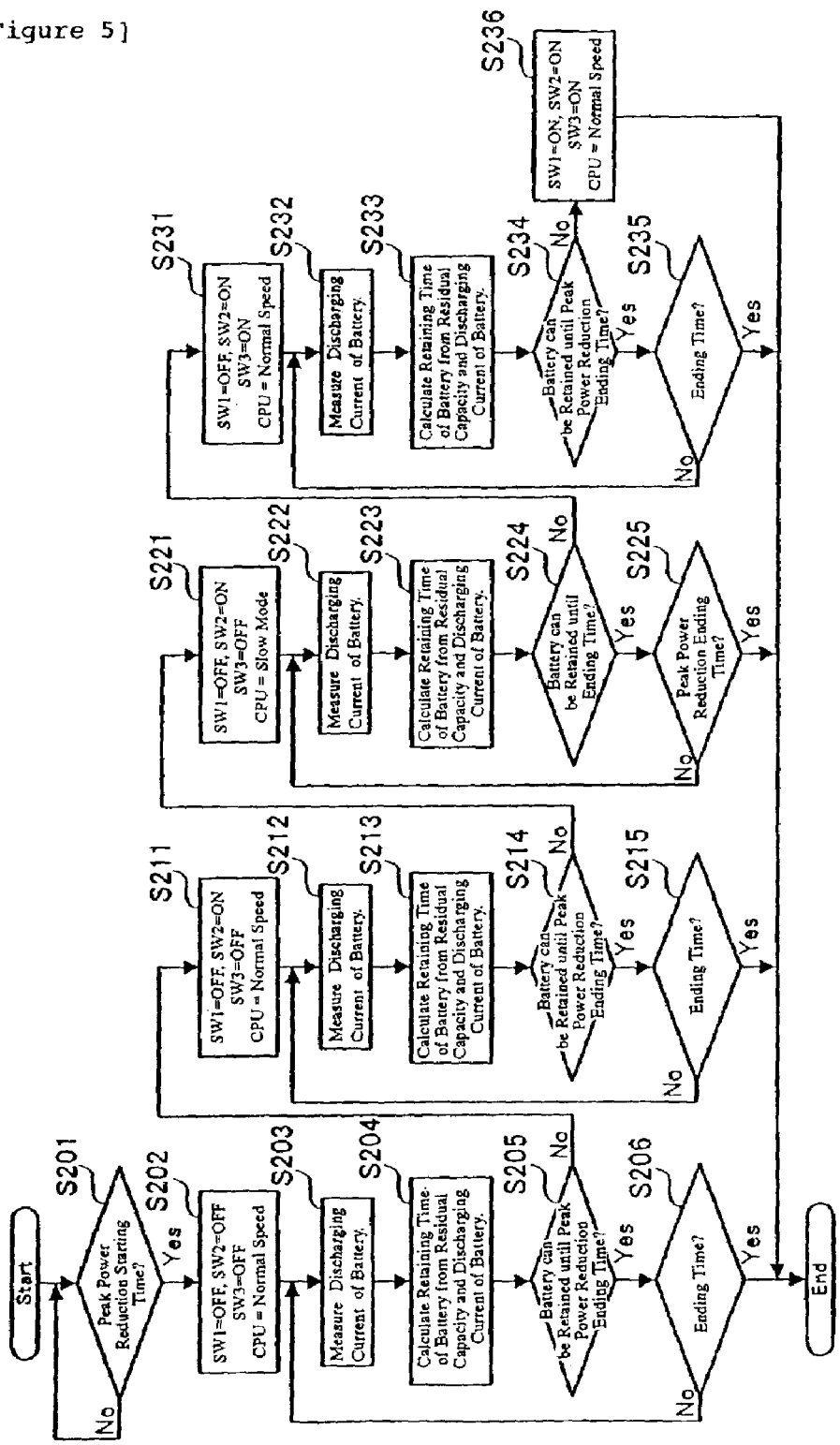

[Figure 6]
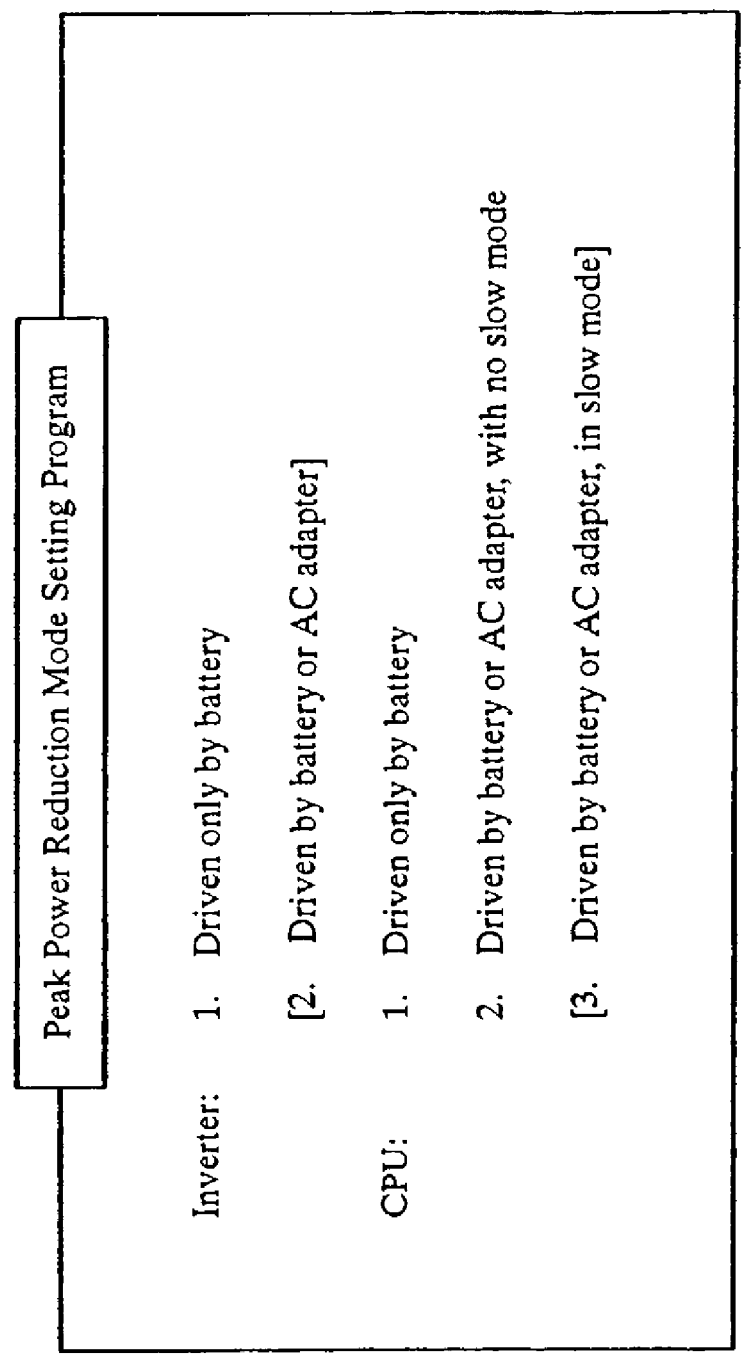

[Figure 7]
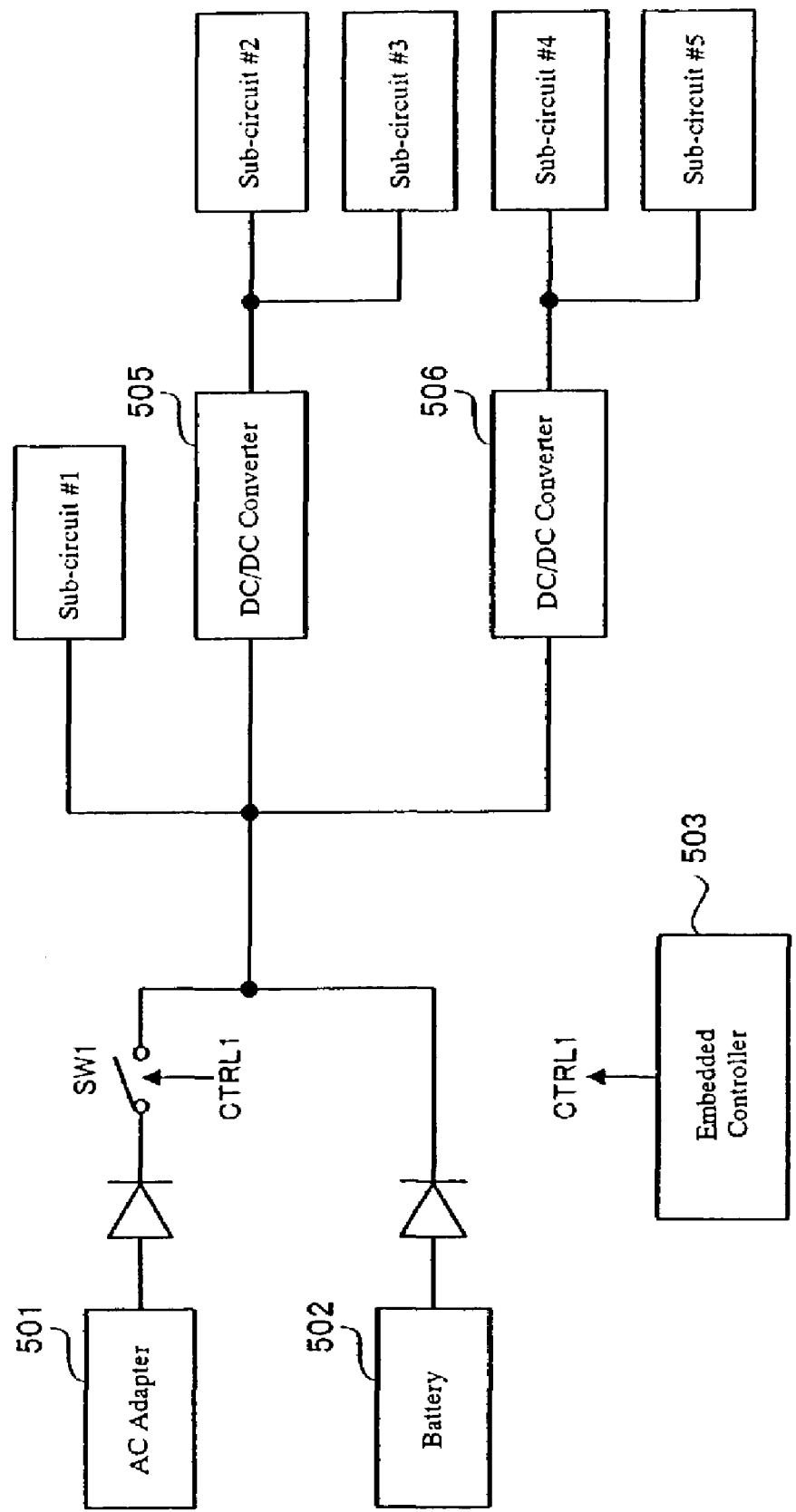

ELECTRICAL APPARATUS, COMPUTER, AND POWER SWITCHING METHOD

BACKGROUND OF THE INVENTION

The present invention relates to electrical apparatuses, etc. enabled to connect such a power source as an AC adapter, etc. and a battery that charges, then discharges to power a subject. More particularly, the present invention relates to electrical apparatuses, etc. enabled to be powered by both of such a power source as an AC adapter, etc. and a battery.

In addition to a commercial power source that supplies a power directly, batteries (power accumulators, secondary batteries, and primary batteries) that can be used limitless by repeating charging and discharging are employed to power information terminals represented by lap-top personal computers (PCs), such personal devices as PDA (Personal Digital Assistant), and various kinds of electrical apparatuses as portable audio devices, video cameras, etc. Nickel hydrogen batteries (NiMH batteries) and nickel cadmium batteries (Ni—Cd batteries) that are comparatively large in capacity and low in price are employed as such batteries. There are also other types of batteries such as lithium ion batteries that are higher in energy density per unit weight than the nickel cadmium batteries, as well as lithium polymer batteries that use solid polymer without using the liquid electrolyte.

FIG. 7 shows a typical circuit diagram of a conventional lap-top PC. In this PC, an AC adapter 501 connected to a commercial power source and enabled to supply a power and a battery 502 that charges, then discharge to supply a power are connected to a body side of the PC respectively. At this body side, subcircuits #1 to #5 are connected to each of the power supplies directly or via a DC/DC converter 505 and a DC/DC converter 506. In this state, an embedded controller 503 controls the CTRL 1 signal to drive the AC adapter 501 or battery 502 selectively. In other words, when the CTRL 1 signal is turned on, a switch (SW1) is turned on, thereby the AC adapter 501 is connected to the PC body. At this time, because the voltage of the battery 502 is lower than that of the AC adapter 501, the AC adapter 501 powers the PC body. On the other hand, when the CTRL 1 signal is opened (off), the battery 502 begins powering the PC body even while the AC adapter 501 is connected to the PC body. In the conventional circuit configuration, the PC is driven by the AC adapter 501 and the battery 502 only in two operation modes, one of which is selected according to the circumstances.

Furthermore, "peak shifting" has also been required in recent years to reduce the peak power consumption in a time zone in which the power consumption rises extremely, for example, in the afternoon in summer due to concurrent operations of coolers. Power companies are also required urgently to increase the capital investment for leveling the power load as much as possible so as to cope with this peak power consumption. One of the "peak shifting" methods is as follows. The electrical apparatus is configured so as to be powered only from the battery 502 while power supply from commercial source via the AC adapter 501 stops in such a much power consuming time zone (for example, for three hours from 1 p.m. to 4 p.m.), thereby such the peak time power consumption will be more reduced.

However, when how lap-top PCs are used is checked, it has been found that the capacity of the battery 502 is often used up in one hour or so. And, after the battery 502 is used up, the PC is powered by the AC adapter 501, so that the peak power consumption can be reduced effectively only for one hour from 1 p.m. to 2 p.m.

In the case where such the power reduction effect cannot be continued up to a desired time zone, one of the effective methods to solve such the problem is a power management function to be executed for lowering the CPU operation speed at the body side and the brightness of the liquid crystal display (LCD). However, this method has another problem, that is to say, lowering the CPU operation speed and the LCD brightness often causes the user to be disappointed at the performance of the PC in specific utilization. In addition, the conventional power management function is insufficient to lower the power, so that the operating time of the battery 502 cannot be extended so long.

Under such circumstances, it is an purpose of the present invention to optimize the power consumption of both a power supply connected to a commercial power source and a battery so as to solve the above described conventional technical problems.

It is another purpose of the present invention to provide an electrical apparatus configured by optimizing the power consumption of each power source and giving consideration to environmental and power problems.

SUMMARY OF THE INVENTION

An electrical apparatus of the present invention in a configuration comprises a body that consumes a power; a power source that powers the body with a power received from a commercial power source; and a battery that repeats charging and discharging to power the body, thereby the power source is used to drive a predetermined subsystem selected from a plurality of subsystems and the battery is used to drive other subsystems of the body concurrently.

In another configuration, an electrical apparatus of the present invention comprises a plurality of subsystems that compose the body; switching means that switches between the power source and the battery for powering the plurality of subsystems; and control means for control the switching means that enables the power source to power the predetermined subsystem selected from the plurality of subsystems and the battery to power other subsystems.

In this case, if this controlling means is characterized so that it detects the retainment state of the battery for a predetermined period, changes the switching means to enable battery to power the plurality of subsystems at a predetermined time based on the detected retainment state, and decides a subsystem to be powered by the power source step by step according to the retainment state, it would be more preferable, since the peak power consumption can be reduced according to the residual capacity of the battery and the state of the power consumption at that time.

On the other hand, a computer of the present invention comprises a system body that is powered; an AC adapter formed to be connectable to this system body and enabled to power the system body with a power received from a commercial power source; a battery formed to be connectable to this system body and enabled to repeat charging and discharging to power the system body; and a controller that suppresses power supply from the AC adapter based on a predetermined condition while both of the AC adapter and the battery are connected to the system body. This power supply suppression is done so as to reduce power supply from the AC adapter while the system body can be powered by both of the AC adapter and the battery.

In another configuration, a computer of the present invention comprises setting means that sets an operation mode for a predetermined subsystem of the system body in a peak power reduction time zone to suppress power supply from the commercial power source; and controlling means that controls power supply to other subsystems in the peak power reduction time zone based on the set by the setting means.

In such a configuration of the computer, if the first operation mode that uses the battery or the second operation mode that uses both of the power source and the battery is set for a CPU that is one of the plurality of subsystems in the peak power reduction time zone, the CPU operation will be controlled effectively in accordance with, for example, the user's desired operation mode. In addition, this setting means, when it can sets whether to operate the CPU in a slow mode, will be possible to control the retaining status of the battery properly in the peak power reduction time zone.

Furthermore, the present invention provides a power supplying method that powers the body while both of the power source connected to a commercial power source and a battery are connected to the body. The method enables the power source to power a predetermined subsystem and the battery to power other subsystems of the body while the power source powers the predetermined subsystem.

Furthermore, a power supplying method of the present invention decides whether or not a peak power reduction time for the commercial power source is reached, thereby, when the time is reached, enabling the battery to power a predetermined subsystem and the power source to power other subsystems of the body.

In the case where the method can decide whether or not the capacity of the battery is retained until a time at which the peak power supply reduction is over and, when the capacity is not retained, increase the number of subsystems to be powered by the power source, it will be possible to solve the problem that the capacity of the battery is used up by the time at which the peak power supply reduction is over. Increasing the number of subsystems to be powered by the power source means, for example, powering the LCD inverter from the power source first, then powering the CPU from the power source as needed.

BRIEF DESCRIPTION OF THE DRAWINGS

Some of the purposes of the invention having been stated, others will appear as the description proceeds, when taken in connection with the accompanying drawings, in which:

FIG. 1 is a hardware block diagram of a computer system, which is an electrical apparatus in an embodiment of the present invention;

FIG. 2 is a circuit diagram of a power supply circuit in the embodiment of the present invention;

FIG. 3 is a flowchart of the processes executed in the circuit shown in FIG. 2 in the embodiment of the present invention;

FIG. 4 is a block diagram of subsystems of a lap-top PC in the embodiment of the present invention;

FIG. 5 is a flowchart of the processes executed in the lap-top PC in the embodiment of the present invention;

FIG. 6 is a mode setting screen on which the user can set a desired operation mode; and FIG. 7 is a typical conventional circuit diagram of a lap-top PC.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, FIG. 1 shows a hardware block diagram of a computer system 10 in a preferred embodiment of the present invention. A computer provided with this computer system 10 is configured as a lap-top PC (lap-top personal computer) in which a predetermined OS is installed by conforming to the OADG (Open Architecture Developer's Group) specifications.

In the computer system 10 shown in FIG. 1, a CPU 11 functions as a brain of the whole computer system 10 and executes various programs including a utility program under the control of the OS. The CPU 11 connects each of the components of the computer system via three buses of an FSB (Front Side Bus) 12, which is a system bus; a PCI (Peripheral Component Interconnect) bus 20 used for fast I/O devices; an ISA (Industry Standard Architecture) bus 40 used for slow I/O devices. This CPU 11 stores program codes and data in a cache memory so as to speed up the processing. In recent years, in addition to an SRAM of about 128K bytes integrated in the CPU 11 and used as a primary cache, the CPU 11 connects a secondary cache 14 of about 512K to 2M bytes via an exclusive BSB (Back Side Bus) 13. The BSB 13 may be omitted and the secondary cache 14 may be connected to the FSB 12 to avoid the use of a package with many terminals and suppress the manufacturing cost.

The FSB 12 and the PCI bus 20 are connected to each other via a CPU bridge (host-PCI bridge) 15 referred to as a memory/PCI chip. This CPU bridge 15 includes a memory controller that controls accesses to the main memory 16 and a data buffer that absorbs a difference between data transfer rates of the FSB 12 and the PCI bus 20. The main memory 16 is an area into which executable programs are read from the CPU 11 and a writable memory used as a work area in which data processed by executable programs are written. For example, the main memory 16 is composed of a plurality of DRAM chips to have a capacity of 64 MB as standard, which can be expanded up to 320 MB. The above executable programs are, for example, various drivers used to operate the OS, as well as the hardware of peripheral devices, application programs used for specific business works, and firmware items such as the BIOS (Basic Input/Output System), etc. stored in a flash ROM 44 (to be described later).

A video subsystem 17 executes video-related functions and it includes a video controller. This video controller processes drawing instructions received from the CPU 11 and writes processed drawing information in a video memory. The video controller also reads drawing information from the video memory and outputs the information to a liquid crystal display (LCD) 18 as drawing data.

The PCI bus 20 can transfer data comparatively fast. The PCI bus 20 is standardized in accordance with the specifications (data bus width: 32 or 64 bits, max. operating frequency: 33 MHz or 66 MHz, max. data transfer rate: 132 MB/sec or 528 MB/sec). This PCI bus 20 is connected to the I/O bridge 21; the card bus controller 22; an audio subsystem 25; the docking station interface (Dock I/F) 26; and the mini-PCI connector 27 respectively.

The card bus controller 22 is used exclusively to connect bus signals of the PCI bus 20 to the interface connector (card bus) of the card bus slot 23 directly. A PC card 24 can be loaded in this card bus slot 23. The docking station interface 26 is a hardware item used to connect a docking station (not shown), which is an expansion unit of the functions of the computer system 10. When a lap-top PC is connected to the docking station, the various hardware items connected to an internal bus of the docking station are connected to the PCI bus 20 via the docking station interface 26. The mini-PCI card 28 is connected to the mini-PCI connector 27.

The I/O bridge 21 functions as a bridge between the PCI bus 20 and the ISA bus 40. The I/O bridge 21 also functions as a DMA controller, a programmable interruption controller (PIC), a programmable interval timer (PIT), an IDE (Integrated Device Electronics) interface, a USB (Universal Serial Bus), and an SMB (System Management Bus) interface. The I/O bridge 21 also includes a built-in real timer clock (RTC).

The DMA controller executes data transfer between each of such peripheral devices as an FDD, etc. and the main memory 16 without the help of the CPU 11. The PIC enables a predetermined program (interruption handler) to run in response to each interrupt request (IRQ) received from peripheral devices. The PIT generates timer signals at predetermined cycles. The IDE interface connects the IDE hard disk drive (HDD) 31, as well as the CD-ROM drive 32 via an ATAPI (AT Attachment Packet Interface). Instead of this CD-ROM drive 32, another type IDE unit such as a DVD (Digital Versatile Disk) drive may be connected to the IDE interface. External storage units such as the HDD 31, the CD-ROM drive 32, etc. are housed in a place referred to as a "media bay" or "device bay" provided in the lap-top PC. Those external storage units provided as standard may be attached replaceably with such other devices as an FDD, a battery pack, etc. or exclusively.

The I/O bridge 21 is also provided with a USB port. This USB port is connected to a USB connector 30 provided, for example, on a wall surface of the lap-top PC body. The I/O bridge 21 is also connected to the EEPROM 33 via the SM bus. This EEPROM 33 is a non-volatile memory used to hold such information as user registered passwords, supervisor passwords, serial numbers of products, etc. The data in this non-volatile memory can be rewritten electrically.

Furthermore, the I/O bridge 21 is connected to the power supply circuit 50. The power supply circuit 50 is provided with, for example, an AC adapter 51 connected to an AC 100 V commercial power source and enabled for AC/DC signal conversion; a battery (secondary battery) 52 consisting of nickel batteries, nickel cadmium batteries, or the like; and such circuits of DC/DC converter (DC/DC) 55 that generates DC constant voltages of +15V, +5V, +3.3V, etc. used for the computer system 10. This battery 52 may be a so-called dam battery that is not provided with a CPU in itself or an intelligent battery provided with a CPU in itself and enabled to communicate with an embedded controller 41 (to be described later) by conforming to, for example, the SBS (Smart Battery System) specifications. In this embodiment, the battery 52 is configured as a battery pack and enabled to be attached to the lap-top PC body removably.

On the other hand, in the core chip of the I/O bridge 21, an internal register used to manage the power state of the computer system 10 and a logic (state machine) used to manage the power state of the computer system 10 including the operation of this internal register are provided. This logic sends/receives various signals to/from a power supply circuit 50 to recognize the actual power supply state of the computer system 10. According to the commands from this logic, the power supply circuit 50 controls the power supply to the computer system 10.

The ISA bus 40 is slower than the PCI bus 20 in data transfer rate (for example, the bus width: 16 bits, the max. data transfer rate: 4 MB/sec). This ISA bus 40 connects the embedded controller 41 connected to the gate array logic 42, the CMOS 43, the flash ROM 44, and the super I/O controller 45. In addition, this ISA bus 40 also connects such peripheral devices as a keyboard/mouse controller that is comparatively slow in operation. The super I/O controller 45 connects an I/O port 46 to control driving of the FDD, the input/output (PIO) of parallel data via a parallel port, and the input/output (SIO) of serial data via a serial port.

The embedded controller 41 controls a keyboard (not shown). In addition, the embedded controller 41 connected to the power supply circuit 50 plays a partial part in the management of the power source together with a built-in power management controller (PMC) and the gate array logic 42.

The computer system 10 in this embodiment can execute the "peak shifting function" (peak power reducing function). The function suppresses the consumption of the power from the commercial power source in a time zone in which the power consumption increases extremely, for example, in the afternoon (ex., 1 p.m. to 4 p.m.) in summer. In order to meet the above requirement, the "peak shifting function" stops the power supply (from the AC adapter 51) from the commercial power source via a power line at a fixed time in a time zone in which the power consumption increases extremely according to the user set value, with a program installed in the system, or with another similar means, for example, in the afternoon in summer, thereby starting the power supply from the battery 52.

The AC adapter 51, which is a power source, is generally provided outside, for example, such an apparatus as a lap-top PC in which the computer system (system body) 10 is installed. Sometimes, the AC adapter 51 is set in the housing of the electrical apparatus, of course. The system body in this case may be configured so as to include an AC inlet and/or DC inlet to/from which a cable connector is connected/disconnected. This AC/DC inlet, when located outside the AC adapter 51, is formed so as to connect/disconnect the connector of a cable to/from the AC adapter 51. When the AC adapter 51 is located in the system body, the AC/DC inlet is formed so as to connect/disconnect the connector directly to/from the commercial power source. The battery 52 may be a battery pack removable freely from the system body. The battery 52 may be set in the housing of the electrical apparatus and formed removably therefrom.

Next, the power supply circuit in this embodiment will be described.

FIG. 2 shows a circuit diagram of the power supply circuit in this embodiment. In FIG. 2, the system body is provided with sub-circuits #1 to #10 denoted as subsystems, as well as a current measuring circuit 61 used to measure the discharging current from the battery 52. The sub-circuits #1 to #10, when connected directly to and powered by the AC adapter 51 or battery 52, are powered via the DC/DC converter 55 (55-1 to 55-4) respectively. In the example shown in FIG. 2, the sub-circuits #1 and #6 are connected directly to the AC adapter 51 or battery 52. The sub-circuits #2 and #3 are connected to the AC adapter 51 or battery 52 via the DC/DC converter 55-1, the sub-circuits #4 and #5 are connected to the AC adapter 51 or battery 52 via the DC/DC converter 55-2, the sub-circuits #7 and #8 are connected to the AC adapter 51 or battery 52 via the DC/DC converter 55-3, and the sub-circuits #9 and #10 are connected to the AC adapter 51 or battery 52 via the DC/DC converter 55-4 respectively.

The five subsystems, which are sub-circuits #6 to #10, can be powered by the AC adapter 51 or battery 52 step by step according to the power supply circumstances. A memory provided in or outside the embedded controller 41 stores the time information for reducing the peak power consumption (to be described later), so that each of the sub-circuit #1 to #10 is controlled in accordance with a value of a clock provided in-or outside the embedded controller 41.

Assume now that the voltage of the battery 52 is higher than that of the AC adapter 51, which is a power source in the circuit shown in FIG. 2. When the embedded controller 41 turns on the switch (SW1), the AC adapter 51 powers the sub-circuits #1 to #5 with its higher voltage. When the switch (SW1) is off, the battery 52 powers those sub-circuits #1 to #5. When the embedded controller 41 turns on the switch (SW2), the sub-circuit #6 is powered by the AC adapter 51. When the switch (SW2) is off, the sub-circuit #6 is powered by the battery 52. In the same way, when the embedded controller 41 turns on the switch (SW3), the sub-circuits #7 and #8 are powered by the AC adapter 51. When the switch (SW3) is off, those sub-circuits #7 and #8 are powered by the battery 52. When the embedded controller 41 turns on the switch (SW4), the sub-circuits #9 and #10 are powered by the AC adapter 51. When the switch (SW4) is off, those sub-circuits #9 and #10 are powered by the battery 52.

In a peak power reduction time zone in which the power consumption increases extremely, for example, in the afternoon in summer, the power supply from the AC adapter 51 can be minimized by using only the battery 52 to power the system body and suppressing the power supply from the AC adapter 51, which is a power source. In this case, the system body is powered only by the battery 52 first, then whether or not the capacity of the battery 52 can retain until the peak power reduction ending time is calculated from the value of the discharging current from the battery 52, measured by the current measuring circuit 61. This retaining time of the battery 52 can be calculated from both of the known capacity of the battery 52 and the estimated PC utilization by the user. The capacity of the battery 52 can be calculated from, for example, the value of the charged current into the battery 52.

If it is found that the battery 52 will not be retained as a result of the calculation, the switch (SW2) of the sub-circuit #6 is turned on so that the sub-circuit #6 is powered by the AC adapter 51. Then, the discharging current from the battery 52 is reduced, thereby the retainment of the battery 52 is extended. If the battery 52 cannot be retained after such the processing, the switch (SW3) of the sub-circuits #7 and #8 are further turned on so that the sub-circuits #7 and #8 are powered by the AC adapter 51. Those operations are repeated to set each of the switches (SW2 to SW4) so that the battery 52 can be retained until the peak power reduction ending time. The utilization of the commercial power in this period can thus be minimized.

FIG. 3 shows a flowchart of the processes executed for the circuit shown in FIG. 2 in this embodiment. Concretely, when a peak power reduction time is set between 1 to 4 p.m., it is decided whether or not the peak power reduction starting time (1 p.m.) is reached (step 101). When the decision result is NO (not reached), the embedded controller 41 waits until the time is reached. When the decision result is YES (reached), the embedded controller 41 turns off the switches (SW1 to SW4) (step 102) to stop the power supply from the AC adapter 51 and instructs the current measuring circuit 61 to measure the discharging current from the battery 52 (step 103). Then, the embedded controller 41 calculates the retaining time of the battery 52 from the residual capacity and the measured discharging current value of the battery 52 (step 104). The embedded controller 41 then decides whether or not the capacity of the battery 52 can be retained until the peak power reduction ending time (ex., 4 p.m.) (step 105). When the decision result is YES (retained), the embedded controller 41 decides whether or not the peak power reduction ending time (ex., 4 p.m.) is reached (step 106). When the decision result is NO (not reached), the embedded controller 41 repeats the processes in and after step 103. When the decision result is YES (reached), the embedded controller 41 exits the processing.

When it is decided in step 105 that the battery 52 cannot retain until the peak power reduction ending time, the embedded controller 41 turns on the switch (SW2) (step 111). In other words, the sub-circuit #6 is powered by the AC adapter 51. In this state, the current measuring circuit 61 measures the discharging current of the battery 52 (step 112) to calculate the retaining time of the battery 52 from the residual capacity and the measured discharging current value of the battery 52 (step 113). Then, it is decided whether or not the battery 52 is retained until the ending time (step 114). When the decision result is YES (retained), it is further decided whether or not the peak power reduction ending time is reached (step 115). When the decision result is NO (not reached), the embedded controller 41 repeats the processes in and after step 112. When the decision result is YES (reached), the embedded controller 41 exits the processing.

When it is decided in step 114 that the battery 52 will not be retained until the peak power reduction ending time, the embedded controller 41 turns on the switches (SW2) and (SW3) (step 121). At this time, the switches (SW1) and (SW4) are off. Thus, the sub-circuits #6 to #8 are powered by the AC adapter 51. The current measuring circuit 61 measures the discharging current of the battery 52 at this time (step 122) to calculate the retaining time of the battery 52 from the residual capacity and the measured discharging current value of the battery 52 (step 123). Then, it is decided whether or not the battery 52 is retained until the ending time (step 124). When the decision result is YES (retained), it is further decided whether or not the peak power reduction ending time is reached (step 125). When the decision result is NO (not reached), the embedded controller 41 repeats the processes in and after step 122. When the decision result is YES (reached), the embedded controller 41 exits the processing.

In the same way, when it is decided in step 124 that the battery 52 will not be retained until the ending time, the embedded controller 41 turns on the switches (SW2 to SW4) and turns off the switch (SW1) (step 131). As a result, the sub-circuits #6 to #10 come to be powered by the AC adapter 51. The current measuring circuit 61 measures the discharging current of the battery 52 at this rime (step 132) to calculate the retaining time of the battery 52 from the residual capacity and the measured discharging current value of the battery 52 (step 133). Then, it is decided whether or not the battery 52 is retained until the ending time (step 134). When the decision result is YES (retained), it is further decided whether or not the peak power reduction ending time is reached (step 135). When the decision result is NO (not reached), the embedded controller 41 repeats the processes in and after step 132. When the decision result is YES (reached), the embedded controller 41 exits the processing. When it is decided in step 134 that the battery 52 will not be retained until the ending time, the embedded controller 41 stops the peak power reduction operation and turns on all the switches (SW1 to SW4) (step 136) so that all the sub-circuits (#1 to #10) are powered by the AC adapter 51. The embedded controller 41 then exits the processing.

In the embodiment as described above, when the set peak power reduction starting time (1 p.m.) is reached, the AC adapter 51 is switched over to the battery 52. At this time, the embedded controller 41 calculates the remaining operation time of the battery 52 from the residual capacity and the discharging current (power supply) value. When the remaining operation time is less than the peak power reduction ending time (4 p.m.), the system goes into the "first dual mode" in which only the sub-circuit #6 is powered by the AC adapter 51. After this, the embedded controller 41 calculates the remaining operation time of the battery from the residual capacity and the power supply value in this "first dual mode" to decide whether or not the battery 52 is retained until the peak power reduction ending time. When the decision result is NO (not retained), the system goes into the "second dual mode" in which, for example, the sub-circuits #7 and #8 are also powered by the AC adapter 51. Hereinafter, the system can go into the third mode, the fourth mode, . . . step by step. By repeating such the operations, thereby the battery 52 can be retained until the peak power reduction ending time is reached.

Next, a description will be made concretely for an embodiment described above with reference to FIGS. 2 and 3. A lap-top PC is employed in that embodiment.

FIG. 4 shows a block diagram of a sub-system of the lap-top PC in this embodiment. In the example shown in FIG. 4, a DC/DC converter 55-5 that supplies a +5V power is connected to two subsystems that are an HDD 31 and a CD-ROM drive 32. A DC/DC converter 55-6 that supplies a +3.3V power is connected to other subsystems that are a memory 34, a PC card 24, a chip set and others 35. On the other hand, the power supply to an inverter 36 of an LCD 18 that works in the dual mode is switched between the AC adapter 51 and the battery 52 by the switch (SW2). The CPU 11 that works in the dual mode receives a +1.3V power from the DC/DC converter 55-7 and the switch (SW3) switches between the AC adapter 51 and the battery 52 to power this DC/DC converter 55-7. The switches (SW2) and (SW3) are controlled by the embedded controller 41.

In the circuit configuration shown in FIG. 4, it is possible to select the power sources of the inverter 36 and the CPU 11, as well as for the user to set a peak power reduction mode as shown in FIG. 6. FIG. 6 shows a mode setting screen on which the user can set an operation mode. On the screen, the user can select his/her desired operation mode from a plurality of peak power reduction modes for the inverter 36 and the CPU 11 respectively. In the example shown in FIG. 6, "driven by battery or AC adapter" is set for the inverter 36 and "driven by battery or AC adapter, in slow mode" is set for the CPU 11 in the peak power reduction time zone respectively.

Next, a description will be made for a case in which the setting shown in FIG. 6 is done for the circuit configuration shown in FIG. 4.

FIG. 5 shows a flowchart of the processes executed for a lap-top PC in this embodiment. At first, when a peak power reduction time zone is set between 1 p.m. and 4 p.m., it is decided whether or not the peak power reduction starting time (1 p.m.) is reached (step 201). The system stands by until the time is reached. When the decision result is YES (reached), the embedded controller 41 turns off the switches (SW1 to SW3) to set the CPU 11 in the normal speed mode (step 202). The CPU 11 employed in the circuit is enabled to control modes. For example, the CPU 11 can operate in two modes (normal mode and slow mode (low-power mode)). There are some methods for reducing the CPU 11 operation speed. For example, the SpeedStep technique (lowering the processor operation frequency and the operation voltage) and the throttling technique (turning on/off the processor periodically, thereby lowering the operation frequency in a pseudo manner) of Intel USA are such the methods. When the CPU 11 is set in the slow mode, the clock frequency of the CPU 11 (850 MHz normally) can be lowered, for example, to 750 MHz and the voltage of the CPU 11 (1.6V normally) can be lowered to, for example, about 1.35V.

The current measuring circuit 61 measures the discharging current of the battery 52 (step 203) after the power supply from the AC adapter 51 stops (step 202). Then, the embedded controller 41 calculates the retaining time of the battery 52 from the residual capacity and the discharging current value (step 204). The embedded controller 41 then decides whether or not the capacity of the battery 52 can be retained until the peak power reduction ending time (ex., 4 p.m.) (step 205). When the decision result is YES (retained), the embedded controller 41 decides whether or not the peak power reduction ending time (ex., 4 p.m.) is reached (step 206). When the decision result is NO (not reached), the embedded controller 41 repeats the processes in and after step 203. When the decision result is YES (reached), the embedded controller 41 exits the processing.

When it is decided in step 205 that the capacity of the battery 52 will not be retained until the peak power reduction ending time, the embedded controller 41 turns on the switch (SW2) (step 211) so that the inverter 36 is powered by the AC adapter 51 (not by the battery 52). In other words, because the user can select the power source for the inverter 36 and the CPU 11 on the setting screen shown in FIG. 6, the user has selected the AC adapter 51 for powering the inverter 36 to reduce the power consumption of the battery 52. In this state, the current measuring circuit 61 measures the discharging current of the battery 52 (step 212), then the embedded controller 41 calculates the retaining time of the battery 52 from the residual capacity and the discharging current value (step 213). The embedded controller 41 then decides whether or not the capacity of the battery 52 can be retained until the peak power reduction ending time (step 214). When the decision result is YES (retained), the embedded controller 41 decides whether or not the peak power reduction ending time is reached (step 215). When the decision result is NO (not reached), the embedded controller 41 repeats the processes in and after step 212. When the decision result is YES (reached), the embedded controller 41 exits the processing.

When it is decided in step 214 that the capacity of the battery 52 will not be retained until the peak power reduction ending time, the embedded controller 41 turns on the switch (SW2) and sets the CPU 11 in the slow mode (step 221) so that the power consumption of the battery 52 is minimized. Then, the current measuring circuit 61 measures the discharging current of the battery 52 again (step 222), and the embedded controller 41 calculates the retaining time of the battery 52 from the residual capacity and the discharging current value (step 223). The embedded controller 41 then decides whether or not the capacity of the battery 52 can be retained until the ending time (step 224). When the decision result is YES (retained), the embedded controller 41 decides whether or not the peak power reduction ending time is reached (step 225). When the decision result is NO (not reached), the embedded controller 41 repeats the processes in and after step 222. When the decision result is YES (reached), the embedded controller 41 exits the processing.

Furthermore, when it is decided in step 224 that the capacity of the battery 52 will not be retained until the peak power reduction ending time, the embedded controller 41 turns on the switches (SW2) and (SW3) while the switch (SW1) is kept off and returns the CPU 11 into the normal speed mode (step 231), so that the inverter 36 and the CPU 11 are powered by the AC adapter 51. In this state, the current measuring circuit 61 measures the discharging current of the battery 52 again (step 232), and the embedded controller 41 calculates the retaining time of the battery 52 from the residual capacity and the discharging current value (step 233). The embedded controller 41 then decides whether or not the capacity of the battery 52 can be retained until the peak power reduction ending time (step 234). When the decision result is YES (retained), the embedded controller 41 decides whether or not the peak power reduction ending time is reached (step 235). When the decision result is NO (not reached), the embedded controller 41 repeats the processes in and after step 232. When the decision result is YES (reached), the embedded controller 41 exits the processing.

When it is decided in step 234 that the capacity of the battery 52 will not be retained until the peak power reduction ending time, the embedded controller 41 decides that the peak power reduction mode cannot be set due to the insufficient capacity of the battery 52. The embedded controller 41 thus stops the peak power reduction operation and turns on the switches (SW1 to SW3) (sten 236) to restore the normal operation so that all the subsystems are powered by the AC adapter 51. The embedded controller 41 then exits the processing. Consequently, each subsystem in the lap-top PC can be driven by an optimal power source in the peak power reduction mode, thereby the commercial power consumption can be minimized in this period.

Next, a description will be made for a scenario for retaining the battery 52 for about three hours with reference to the flowchart shown in FIG. 5 when it is decided that the battery 52 will not be retained so long even in the battery driving mode. It is assumed here that the capacity of the battery 52 is 40 Wh and the typical power consumption of each subsystem is as shown below.

HDD 31 . . . 0.8W, CD-ROM drive 32 . . . 1.0W

Memory 34 . . . 1.2W, PC card 24 . . . 2.0W

Chip set and others 35 . . . 4.0W, inverter 36 . . . 5W

CPU 11 . . . 6W (normal speed mode)/2W (slow mode)

As shown in the flowchart in FIG. 5, when the peak power reduction starting time is reached, all the above subsystems are driven by the battery 52. At this time, the total power consumption of the system is 20W, so that the operation time of the battery is calculated as 2.0 hours (=40 Wh/20W). To retain the battery 52 for three hours here, the battery 52 is switched over to the AC adapter 51 so as to power the inverter 36. Thus, the power consumption of the battery 52 becomes 15W (=20W−5W), so that the retaining time of the battery 52 becomes 2.7 hours (=40 Wh/15 Wh). Because this cannot satisfy the requirement of three hours yet, the CPU 11 is set in the slow mode. Consequently, the power consumption of the battery 52 becomes 11 W (=15W−4W), thereby the retaining time of the battery becomes 3.6 hours (=40 Wh/11 W). This can satisfy the requirement of three hours. The inverter 36 can thus be driven until the peak power reduction ending time is reached. When the ending time is reached, the inverter 36 is restored into the initial operation state. And, the battery 52 can be retained for a required time while the power consumption of the commercial power source is suppressed.

Next, a description will be made for priorities in which operation states are switched over sequentially.

In this embodiment, operation modes are switched over step by step as shown in FIG. 5 in the order of higher priorities so that the switching is noticed less by the user and enabled to extend the driving time of the battery 52 more effectively (so as to reduce the power consumption of the battery 52).

In the first step, the battery 52 is switched over to the AC adapter 52 to drive the inverter 36. If the panel of the LCD 18 is kept at the same brightness at this time, the user will not notice the operation mode change at all while the power consumption of the battery 52 is reduced by 5W.

In the second step, the CPU 11 is set in the slow mode (for example, the SpeedStep of Intel Inc. is set in the Low Power mode). At this time, the user will not notice the lowered performance of the CPU 11 almost at all while the power consumption of the battery 52 is reduced by 4W.

In the next third step, the battery 52 is switched over to the AC adapter 51 to drive the CPU 11. In the event of this switching in the normal operation mode (for example, the SpeedStep of Intel Inc. is kept in the High Performance mode), the user will not notice the change of the operation state at all while the power consumption of the battery 52 can be reduced by 2W. The above scenario is thus effective to execute the processes shown in FIG. 5.

Next, a description will be made for another scenario in which, unlike the processes shown in FIG. 5, driving by the battery 52 increases step by step while driving by the AC adapter 51 is set as default. It is premised here that the power consumption value of each subsystem is as described above.

At first, all the subsystems are driven by the AC adapter 51. When the peak power reduction starting time (ex., 1 p.m.) is reached, all the circuits other than the inverter 36 and the CPU 11 are driven by the battery 52 in the first step. In other words, the embedded controller 41 turns off the switch (SW1) and turns on the switches (SW2) and (SW3). At this time, the driving time of the battery 52 is calculated as 4.4 hours (=40 Wh/9W), which is enough to retain the capacity of the battery 52 for more than three hours.

In the second step, the CPU 11 is also driven by the battery 52. In other words, the embedded controller 41 turns off the switches (SW1) and (SW3) and turns on the switch (SW2). At this time, the driving time of the battery 52 is calculated as 2.7 hours (=40 Wh/15W), which cannot satisfy the requirement of three hours.

This is why the CPU 11 is shifted into the slow mode in the third step while the CPU 11 is driven by the battery 52. In other words, the embedded controller 41 turns off the switches (SW 1) and (SW3) and turns on the switch (SW2). At this time, the driving time of the battery 52 is calculated as 3.6 hours (=40 Wh/11W), which assures the capacity of the battery 52 to be retained for more than three hours.

In the fourth step, the inverter 36 is also driven by the battery 52. Concretely, the embedded controller 41 turns off all the switches (SW1 to SW3). At this time, the driving time of the battery 52 is calculated as 2.5 hours (=40 Wh/16W), which is less than three hours.

This is why the state in the third step is restored in the fifth step, since the remaining driving time of the battery 52 is less than three hours in the above fourth step. Concretely, the embedded controller 41 turns off the switches (SW1) and (SW3) and turns on the switch (SW2). The state in this fifth step is kept until the peak power reduction ending time (ex., 4 p.m.) is reached. When the ending time is reached, the inverter 36 is restored into the initial driving state.

Both of the AC adapter 51 and the battery 52 can be used together in the peak power reduction time even when driving by the AC adapter 51 is set as default, thereby the commercial power consumption is reduced with the operations in the first to fifth steps. In the circuit shown in FIG. 4, the current measuring circuit 61 is located at the output side of the battery 52 and the discharging current of the battery 52 is measured to obtain necessary power consumption for the system. When executing the operations in the first to fifth steps described above, however, the current measuring circuit 61 should preferably be located at the output side of the AC adapter 51 so that the embedded controller 41 can measure the current supply from the AC adapter 51 to obtain the necessary power consumption.

As described above, this embodiment employs a dual mode in which both of the battery 52 and the AC adapter 51 are used to drive the respective subsystems in addition to the power supply mode in which either the battery 52 or AC adapter 51 is used for driving the subsystems. In this dual mode, it is possible to select the battery 52 or AC adapter 51 to drive the respective subsystems in the electrical circuit according to whether or not the battery 52 can be retained until a time for stopping the power supply from the AC adapter 51. Consequently, the power consumption states of the AC adapter 51 and the battery 52 employed as power sources can be optimized.

The above-described scenarios are all described so that the driving of the battery 52 is kept for a certain time (three or more hours in the above example) until the peak shifting ending time (ex., 4 p.m.) so as to simplify the description. Usually, however, the power consumption is varied according to how the user operates the lap-top PC. Even when the retaining time of the battery 52 is calculated as three or more hours, the actual driving time often becomes less than three hours. In order to solve this problem, therefore, it is calculated periodically (e.g. every ten minutes) whether or not the battery 52 can be retained until a set peak power reduction ending time from the relationship between the residual capacity and the power consumption (or current consumption) of the battery 52. When the battery 52 cannot be retained, the battery should preferably be shifted further into the exactly optimized optimal driving state.

Furthermore, although a peak shifting time is picked up as an example for reducing the commercial power consumption in this embodiment, the present invention is not limited only to the example; the dual mode in this embodiment may be used in any other utilization forms. In addition, although a lap-top PC that can be powered by both of the AC adapter 51 and the battery 52 is picked up as an example in the above embodiment, the present invention may also apply to any other electrical apparatuses enabled to be powered by both of a power source connected to a commercial power source and the battery 52, of course.

In the drawings and specifications there has been set forth a preferred embodiment of the invention and, although specific terms are used, the description thus given uses terminology in a generic and descriptive sense only and not for purposes of limitation.

We claim:

1. An electrical apparatus comprising:
   a plurality of subsystems;
   a power adapter operable to power each of the plurality of subsystems with power received from a commercial power source;
   a battery operable to power each of the plurality of subsystems;
   a plurality of switches operable to switch a power supply to each of the plurality of subsystems between the power adapter and the battery; and
   a controller operable to control the plurality of switches, wherein the controller is further operable to
      control the plurality of switches to switch the power supply to each of the plurality of subsystems to the battery at a start of a peak power reduction time zone so that each of the plurality of subsystems is powered by the battery at the start of the peak power reduction time zone,
      determine whether the battery will be able to power each of the plurality of subsystems until an end of the peak power reduction time zone, and
      change at least one of the plurality of switches to switch the power supply to at least one of the plurality of subsystems from the battery to the power adapter responsive to a determination that the battery will not be able to power each of the plurality of subsystems until the end of the peak power reduction time zone so that the at least one subsystem is powered by the power adapter while one or more other subsystems are concurrently powered by the battery,
   wherein the peak power reduction time zone is a period of time during a day associated with high power consumption.

2. The electrical apparatus of claim 1, wherein determination of whether the battery will be able to power each of the plurality of subsystems until the end of the peak power reduction time zone is based on a residual capacity of the battery and a discharging current from the battery.

3. The electrical apparatus of claim 2, further comprising a current measuring circuit operable to measure the discharging current from the battery.

4. The electrical apparatus of claim 1, wherein the controller is further operable to determine whether the battery will be able to power each of the one or more other subsystems until the end of the peak power reduction time zone, and
   change at least another of the plurality of switches to switch the power supply to at least one of the one or more other subsystems from the battery to the power adapter responsive to a determination that the battery will not be able to power each of the one or more other subsystems until the end of the peak power reduction time zone.

5. The electrical apparatus of claim 1, wherein the power adapter is an AC adapter.

6. A computer comprising:
   a plurality of subsystems;
   a power adapter operable to power each of the plurality of subsystems with power received from a commercial power source;
   a battery operable to power each of the plurality of subsystems;
   a plurality of switches operable to switch a power supply to each of the plurality of subsystems between the power adapter and the battery; and
   a controller operable to control the plurality of switches, wherein the controller is further operable to
      control the plurality of switches to switch the power supply to each of the plurality of subsystems to the battery at a start of a peak power reduction time zone so that each of the plurality of subsystems is powered by the battery at the start of the peak power reduction time zone, determine whether the battery will be able to power each of the plurality of subsystems until an end of the peak power reduction time zone, and change at least one of the plurality of switches to switch the power supply to at least one of the plurality of subsystems from the battery to the power adapter responsive to a determination that the battery will not be able to power each of the plurality of subsystems until the end of the peak power reduction time zone so that the at least one subsystem is powered by the power adapter while one or more other subsystems are concurrently powered by the battery, wherein the peak power reduction time zone is a period of time during a day associated with high power consumption.

7. The computer of claim 6, wherein determination of whether the battery will be able to power each of the plurality of subsystems until the end of the peak power reduction time zone is based on a residual capacity of the battery and a discharging current from the battery.

8. The computer of claim 7, further comprising a current measuring circuit operable to measure the discharging current from the battery.

9. The computer of claim 6, wherein the controller is further operable to determine whether the battery will be able to power each of the one or more other subsystems until the end of the peak power reduction time zone, and change at least another of the plurality of switches to switch the power supply to at least one of the one or more other subsystems from the battery to the power adapter responsive to a determination that the battery will not be able to power each of the one or more other subsystems until the end of the peak power reduction time zone.

10. The computer of claim 6, wherein the power adapter is an AC adapter.

11. The computer of claim 6, wherein the computer is a desktop computer or a laptop computer.

* * * * *